P. DIEHL & H. EICHHORN.
BALL BEARING PITMAN.
APPLICATION FILED SEPT. 14, 1909.
997,376.
Patented July 11, 1911.
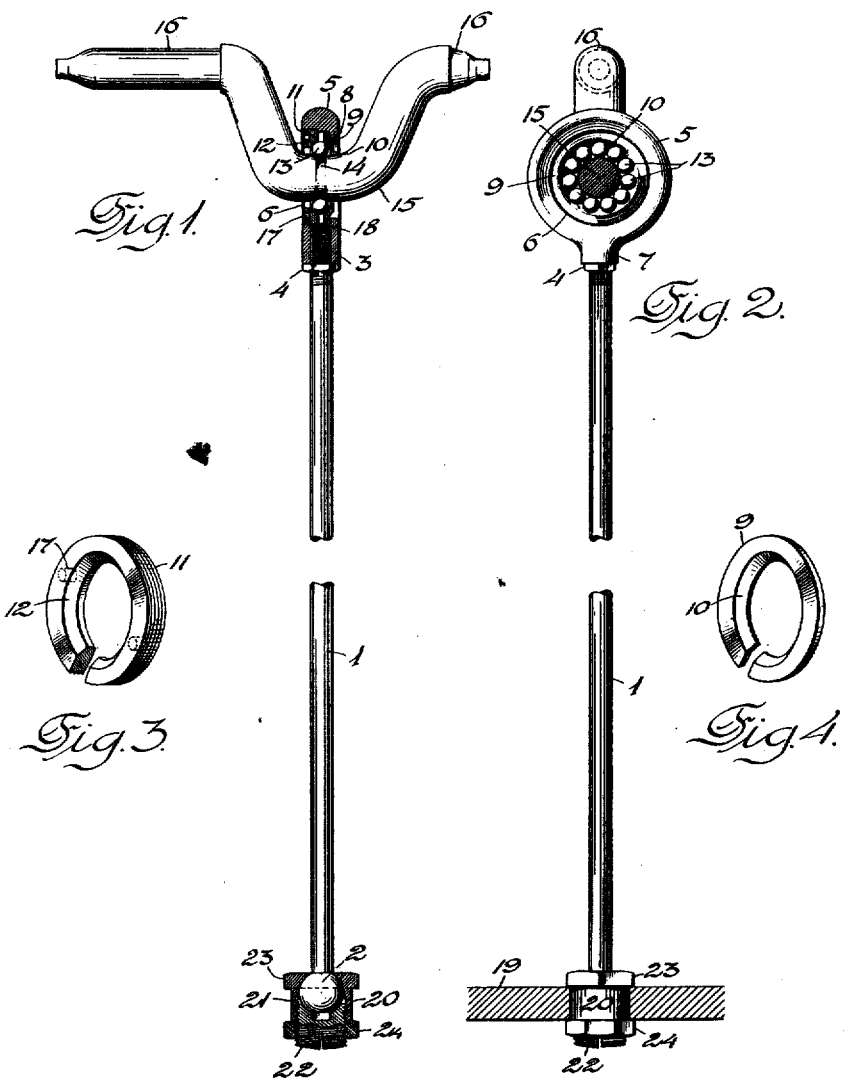

UNITED STATES PATENT OFFICE.

PHILIP DIEHL AND HERMANN EICHHORN, OF ELIZABETH, NEW JERSEY, ASSIGNORS TO THE SINGER MANUFACTURING COMPANY, A CORPORATION OF NEW JERSEY.

BALL-BEARING PITMAN.

997,376.

Specification of Letters Patent.

Patented July 11, 1911.

Application filed September 14, 1909. Serial No. 517,555.

*To all whom it may concern:*

Be it known that we, PHILIP DIEHL and HERMANN EICHHORN, citizens of the United States, residing at Elizabeth, in the county of Union and State of New Jersey, have invented certain new and useful Improvements in Ball-Bearing Pitmen, of which the following is a specification, reference being had therein to the accompanying drawings.

This invention is directed more particularly to an improvement in the pitman forming the subject of the United States patent to P. Diehl and F. Muller, No. 634,205, dated October 3, 1899, and it has for its object to simplify the construction of the ball-bearing pitman strap.

In the earlier construction, the strap at the upper end of the pitman-rod or bar was formed with an integral ball-race member adjacent which was formed in one face of the strap an internally threaded annular recess in which was screwed a ring or cap provided with a second ball-race member opposed to and in angular relation with the other to form a groove between which and the grooved crank of the band-wheel shaft was interposed a series of anti-friction balls.

According to the present improvement, the strap is formed in one face with a recess having a seat upon its inner end to which is applied a loose ring or washer having one of the ball-race members, the other of such members being formed upon an annular screw-plug fitted to the other portion of said recess. The strap is formed with a boss having an internally threaded perforation entering the lateral recess, and the adjacent threaded end of the pitman-rod is adapted to be introduced in such aperture and extended into contact with the screw-plug to prevent the turning of the same and consequent disarrangement of the parts of the ball-bearing.

In the accompanying drawings, Figure 1 is a sectional elevation of the pitman and connected parts, and Fig. 2 is a sectional view of the crank with the pitman embracing the same, the screw-plug of the latter being omitted. Figs. 3 and 4 are perspective views, respectively, of the parts provided with the ball-race members of the pitman.

The rod or bar 1 is shown provided at its lower end with a ball 2 and at its upper end with a threaded extremity 3 carrying the jam-nut 4. The strap 5 consists preferably of a cast iron ring formed in one of its faces with an annular recess 6 and having at one side a lateral boss 7 provided with a threaded radial aperture leading into one side of the recess 6, and fitted to the threaded end of the rod or bar 1.

The recess 6 is provided at its inner end with a seat 8 upon which rests the adjacent face of a washer 9 whose opposite face is formed with a conical ball-race member 10. To the internally threaded opposite end portion of the recess 6 is fitted the externally threaded cap or plug 11 formed with a conical ball-race member 12 opposed to and in angular relation with that of the washer 9 with which it affords an annular groove for a series of anti-friction balls 13 entering a groove or run-way 14 of the crank 15 formed intermediate the ends of the band-wheel shaft 16.

The parts 5, 9 and 11 are made with sufficiently large central openings to enable them to be readily slipped over the bent crank 15 of the band wheel-shaft, and the parts may be readily assembled by first dropping the washer 9 in its place in the recess 6, introducing the crank 14, then inserting the balls into the recess 6 intermediate the race member 10 and groove 14, and finally applying the cap or plug 11 by means of a suitable wrench entering the holes 17 made therefor in the cap. By screwing the rod 1 into its threaded aperture of the boss 7, it is made to serve as a set-screw to bear upon the side of the cap or plug 11 to hold the same in its proper position of adjustment. In practice, intermediate the threaded extremity of the rod 1 and the cap 11 is interposed a block 18 of soft metal, such as brass, to prevent the injury of the threads of the part 11. The office of the jam-nut 4 is obviously to secure the rod 1 against turning in the boss 7 after it is firmly seated upon the side of the cap 11 or the interposed block 18.

In the prior construction before referred to, the hardening of the integral ball-race member of the strap, after the completion of the machine work thereon, was sometimes attended with distortion effected in the cooling of the part, thus necessitating subsequent grinding to insure the required accuracy of the ball-race member. According to the present improvement, both ball-race members of the strap being provided upon comparatively small parts, the hardening is more easily and uniformly effected and the parts are more easily handled in the manufacture of the bearing.

To provide a flexible connection between the lower end of the pitman-rod or bar 1 and the treadle-plate 19, a thimble 20 is provided with a socket 21 whose upper end is fitted to the top of the ball 2 and whose lower portion is internally threaded to receive a screw-plug 22 having its upper end fitted to the lower side of the ball 2. The exterior of the thimble 20 is fitted loosely within an aperture in the treadle-plate and provided at its upper end with an annular flange or nut 23. To the lower end of the screw-plug 22 is applied the clamp-nut 24 between which and the flange 23 of the thimble 20 the treadle-plate is firmly clamped, and the lower end of the pitman-rod thus attached thereto by a universal joint connection.

Having thus set forth the nature of the invention, what we claim herein is:—

1. The combination with a crank-shaft formed with a crank having an annular groove, of a pitman comprising a rod or bar provided at one end with a strap embracing the grooved crank and formed with a lateral recess having an annular seat at one end and internally threaded in the other end portion, a loose washer inserted within and resting upon the seat in said recess and formed with a conical ball-race member, an externally-threaded annular screw-plug fitted within the threaded portion of said recess and affording a conical ball-race member opposed to and in angular relation with that of said washer, anti-friction balls embraced by said ball-race members and the groove of said crank, and means positively connected with the internally-threaded pitman member for locking said plug against turning.

2. The combination with a crank-shaft formed with a crank having an annular groove, of a pitman comprising a rod or bar provided at one end with a strap embracing the grooved crank and formed with a lateral recess having an annular seat at one end and internally threaded in the other end portion, said strap being formed with an internally threaded radial aperture intersecting said recess and to which the threaded end of the rod or bar is fitted, a loose washer inserted within and resting upon the seat in said recess and formed with a conical ball-race member, an externally-threaded annular screw-plug fitted within the threaded portion of said recess and affording a conical ball-race member opposed to and in angular relation with that of said washer, the rod or bar being adapted to enter said threaded aperture and engage said plug within its recess, and anti-friction balls embraced by said ball-race members and the groove of said crank.

In testimony whereof, we have signed our names to this specification, in the presence of two subscribing witnesses.

PHILIP DIEHL.
HERMANN EICHHORN.

Witnesses:
D. P. BIRNIE,
NORMAN J. ACKER.

---

Copies of this patent may be obtained for five cents each, by addressing the "Commissioner of Patents, Washington, D. C."